US009912618B2

(12) United States Patent
Lee et al.

(10) Patent No.: US 9,912,618 B2
(45) Date of Patent: Mar. 6, 2018

(54) ALLOW HIDDEN AND SILENT OBSERVERS IN A GROUP CONVERSATION

(71) Applicant: International Business Machines Corporation, Armonk, NY (US)

(72) Inventors: Ho Yin Lee, Hong Kong (CN); Hon Chung Tang, Hong Kong (CN); Ka Chun Wong, Hong Kong (CN); Wing Kong Yip, Hong Kong (CN)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 14/642,981

(22) Filed: Mar. 10, 2015

(65) Prior Publication Data

US 2016/0269452 A1 Sep. 15, 2016

(51) Int. Cl.
*H04L 12/58* (2006.01)
*H04L 29/06* (2006.01)

(52) U.S. Cl.
CPC .......... *H04L 51/04* (2013.01); *H04L 51/046* (2013.01); *H04L 51/12* (2013.01); *H04L 51/14* (2013.01);
(Continued)

(58) Field of Classification Search
CPC ..... H04L 51/04; H04L 51/12; H04L 65/1076; H04L 65/1093; H04L 65/4038
(Continued)

(56) References Cited

U.S. PATENT DOCUMENTS 7,124,164 B1 * 10/2006 Chemtob ............... G06Q 10/10
709/204
7,457,842 B2 11/2008 Heilmann
(Continued)

FOREIGN PATENT DOCUMENTS

WO 2008139495 A2 11/2008

OTHER PUBLICATIONS

Mell et al., "The NIST Definition of Cloud Computing," National Institute of Standards and Technology, Information Technology Laboratory, Oct. 7, 2009, Version 15.
(Continued)

*Primary Examiner* — Nicholas Taylor
*Assistant Examiner* — Chong G Kim
(74) *Attorney, Agent, or Firm* — Patricia B. Feighan

(57) ABSTRACT

A method to enable a participant within a plurality of participants in an online group conversation to add at least one additional participant as an observer to the online group conversation is provided. The method may include receiving a request to add the observer to the online group conversation. The method may include adding the observer to the online group conversation. The method may also include detecting a message being sent from the added observer. The method may include redirecting the detected message to the enabled participant. The method may also include displaying the redirected message in a user interface (UI) to the enabled participant. The method may further include detecting a modification or a deletion of the displayed redirected message by the enabled participant. The method may include sending the message to the plurality of participants, whereby the sent message is in an original format or a modified format.

13 Claims, 7 Drawing Sheets

(52) U.S. Cl.
CPC ...... *H04L 65/1076* (2013.01); *H04L 65/1093* (2013.01); *H04L 65/4038* (2013.01)

(58) Field of Classification Search
USPC .......................................................... 709/204
See application file for complete search history.

(56) References Cited

U.S. PATENT DOCUMENTS

| | | | |
|---|---|---|---|
| 7,653,711 B2* | 1/2010 | Jinks | G06Q 10/107 709/223 |
| 7,805,491 B2 | 9/2010 | Jones et al. | |
| 7,882,183 B2 | 2/2011 | Craft et al. | |
| 8,010,602 B2 | 8/2011 | Shen et al. | |
| 8,055,718 B2 | 11/2011 | Slaybers | |
| 8,126,969 B1* | 2/2012 | Hall | G06Q 10/10 709/206 |
| 8,171,089 B2 | 5/2012 | Nersu et al. | |
| 2003/0233410 A1* | 12/2003 | Gusler | G06Q 10/107 709/206 |
| 2004/0221012 A1* | 11/2004 | Heumesser | G06Q 10/107 709/206 |
| 2004/0260771 A1* | 12/2004 | Gusler | H04L 12/581 709/206 |
| 2005/0108402 A1* | 5/2005 | Colson | G06Q 10/06 709/227 |
| 2005/0132066 A1* | 6/2005 | Heilmann | G06Q 10/107 709/228 |
| 2005/0160292 A1* | 7/2005 | Batthish | H04L 12/58 726/5 |
| 2006/0047753 A1 | 3/2006 | Pal | |
| 2007/0124392 A1* | 5/2007 | Goldberg | G06Q 10/107 709/206 |
| 2007/0288560 A1* | 12/2007 | Bou-Ghannam | G06Q 10/107 709/204 |
| 2008/0005355 A1* | 1/2008 | Craft | G06Q 10/107 709/245 |
| 2008/0168146 A1* | 7/2008 | Fletcher | H04L 51/36 709/206 |
| 2008/0195710 A1* | 8/2008 | Slaybers | H04L 51/28 709/206 |
| 2008/0235334 A1* | 9/2008 | Gupta | G06Q 10/107 709/206 |
| 2009/0031393 A1* | 1/2009 | Denner | G06Q 10/00 726/1 |
| 2009/0138559 A1* | 5/2009 | Jones | G06Q 10/00 709/206 |
| 2009/0150498 A1* | 6/2009 | Branda | G06Q 10/107 709/206 |
| 2009/0157414 A1* | 6/2009 | O'Sullivan | G06Q 10/02 705/5 |
| 2009/0228583 A1* | 9/2009 | Pocklington | H04L 12/58 709/224 |
| 2009/0307317 A1* | 12/2009 | Essenmacher | G06Q 10/107 709/206 |
| 2010/0057537 A1* | 3/2010 | Dale | G06Q 10/101 705/300 |
| 2010/0070590 A1* | 3/2010 | Waldman | G06Q 10/107 709/206 |
| 2010/0070591 A1* | 3/2010 | Steuer | G06F 15/16 709/206 |
| 2010/0076989 A1* | 3/2010 | Jakobson | G06Q 10/00 707/758 |
| 2011/0225245 A1* | 9/2011 | Bhogal | G06Q 10/107 709/206 |
| 2012/0110092 A1* | 5/2012 | Keohane | G06Q 10/107 709/206 |
| 2012/0143972 A1* | 6/2012 | Malik | H04L 51/36 709/206 |
| 2012/0144318 A1* | 6/2012 | Khadilkar | H04L 12/581 715/753 |
| 2013/0159879 A1* | 6/2013 | Affronti | G06Q 10/107 715/752 |
| 2013/0185363 A1* | 7/2013 | DeLuca | H04L 51/16 709/206 |
| 2013/0262599 A1* | 10/2013 | Lee | G06F 9/461 709/206 |
| 2013/0290435 A1* | 10/2013 | Martin | H04L 51/28 709/206 |
| 2014/0149522 A1* | 5/2014 | Mok | H04L 51/04 709/206 |
| 2014/0222924 A1* | 8/2014 | Rasmussen | G06Q 10/107 709/204 |
| 2014/0310365 A1* | 10/2014 | Sample | H04L 51/16 709/206 |
| 2014/0351356 A1* | 11/2014 | Wall | G06Q 10/107 709/206 |
| 2015/0032827 A1* | 1/2015 | Tyler | H04L 51/16 709/206 |
| 2015/0149567 A1* | 5/2015 | Shmilov | H04W 4/12 709/206 |
| 2016/0057089 A1* | 2/2016 | Agrawal | H04L 51/16 709/206 |
| 2016/0275166 A1* | 9/2016 | Bhatt | G06F 17/30595 |

OTHER PUBLICATIONS

University of Pittsburgh, "Using the Blind Carbon Copy (BCC) Feature to Protect the Privacy of Email Addresses," Information Technology, p. 1-10, http://www.technology.pitt.edu/support/using-the-blind-carbon-copy-bcc-feature-to-protect-the-privacy-of-email-addresses, Accessed on Feb. 9, 2015.
Xenforo, "Hidden Conversation Participants," XenForo Suggestions Discussion, Jan. 13, 2011, p. 1-6, XenForo Ltd., https://xenforo.com/community/threads/hidden-conversation-participants.10436/, Accessed on Feb. 9, 2015.
IBM, "List of IBM Patents or Patent Applications Treated as Related (Appendix P)," Mar. 21, 2016, p. 1-2.
Lee et al., "Allow Hidden and Silent Observers in a Group Conversation," Application and Drawings, filed Mar. 21, 2016, 34 Pages, U.S. Appl. No. 15/075,240.

* cited by examiner

ALLOW HIDDEN AND SILENT OBSERVERS IN A GROUP CONVERSATION

BACKGROUND

The present invention relates generally to the field of computers, and more particularly to online group conversations.

An online group conversation may be based on emails or instant messaging systems, such as Sametime® (Sametime® and all Sametime®—based trademarks and logos are trademarks or registered trademarks of IBM Corporation and/or its affiliates), Skype® (Skype® and all Skype®-based trademarks and logos are trademarks or registered trademarks of Skype Technologies S.A. and/or its affiliates), WeChat® (Wechat® and all Wechat®—based trademarks and logos are trademarks or registered trademarks of Tencent Holdings Limited and/or its affiliates). In many cases a participant in the online conversation may want to include one or more people to observe the discussion in the conversation in real time, however the participant may not want to explicitly add these observers as active participants in the conversation. In such cases, the participant may want to let the observers know what is going on in the discussion, but does not want to expose the identities of the observers, does not want the observers to participate in the conversation directly, or simply does not want other participants in the conversation to know these observers are watching over the discussion.

SUMMARY

According to one embodiment, a method to enable a participant within a plurality of participants in an online group conversation to add at least one additional participant as an observer to the online group conversation is provided. The method may include receiving a request to add the observer to the online group conversation. The method may also include adding the observer to the online group conversation based on the received request. The method may further include detecting a message being sent from the added observer. The method may include redirecting the detected message to the enabled participant. The method may also include displaying the redirected message in a user interface (UI) to the enabled participant. The method may further include detecting a modification or a deletion of the displayed redirected message by the enabled participant. The method may include sending the displayed redirected message from the enabled participant to the plurality of participants, whereby the sent message is in an original format or a modified format.

According to another embodiment, a computer system to enable a participant within a plurality of participants in an online group conversation to add at least one additional participant as an observer to the online group conversation is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a request to add the observer to the online group conversation. The method may also include adding the observer to the online group conversation based on the received request. The method may further include detecting a message being sent from the added observer. The method may include redirecting the detected message to the enabled participant. The method may also include displaying the redirected message in a user interface (UI) to the enabled participant. The method may further include detecting a modification or a deletion of the displayed redirected message by the enabled participant. The method may include sending the displayed redirected message from the enabled participant to the plurality of participants, whereby the sent message is in an original format or a modified format.

According to yet another embodiment, a computer program product to enable a participant within a plurality of participants in an online group conversation to add at least one additional participant as an observer to the online group conversation is provided. The computer program product may include one or more computer-readable storage devices and program instructions stored on at least one of the one or me tangible storage devices, the program instructions executable by a processor. The computer program product may include program instructions to receiving a request to add the observer to the online group conversation. The computer program product may also include program instructions to add the observer to the online group conversation based on the received request. The computer program product may further include program instructions to detect a message being sent from the added observer. The computer program product may include program instructions to redirect the detected message to the enabled participant. The computer program product may also include program instructions to display the redirected message in a user interface (UI) to the enabled participant. The computer program product may further include program instructions to detect a modification or a deletion of the displayed redirected message by the enabled participant. The computer program product may include program instructions to send the displayed redirected message from the enabled participant to the plurality of participants, whereby the sent message is in an original format or a modified format.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
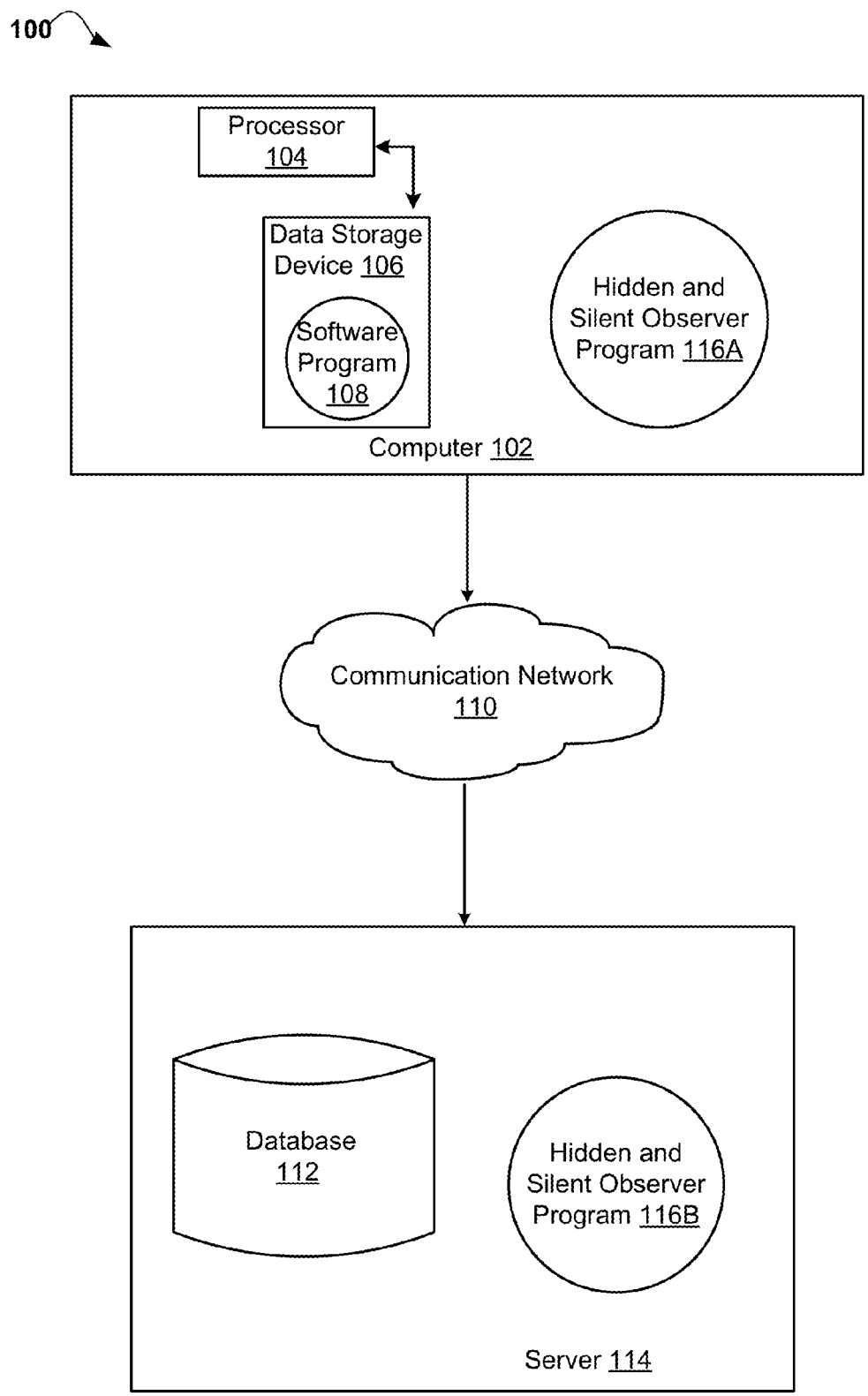
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to online group conversations. The following described exemplary embodiments provide a system, method and program product to, among other things, allow hidden and silent observers in an online group conversation. Therefore, the present embodiment has the capacity to improve the technical field of online group conversations by allowing a participant in an online group conversation to add hidden or silent observers. More specifically, the present embodiment may allow the observer to respond to messages in the group conversation, however, only the participant who adds the observer to the online conversation may see the observer's responses. Furthermore, upon receiving the response messages from the observer, the enabler may have the option to pass the response messages from the observer to other participants in the group conversation as a regular message sent from the enabler.

As previously described, a participant in the online conversation may want to include one or more people to observe the discussion in the conversation in real time, however the participant may not want to explicitly add these observers as active participants in the conversation. In such cases, the participant may want to let the observers know what is going on in the discussion, but does not want to expose the identities of the observers, does not want the observers to participate in the conversation directly, or simply does not want other participants in the conversation to know these observers are watching over the discussion.

For example, an Account manager of a sales team may be having an email discussion with an external customer on some technical issues. The Account manager may need the support from two of the Development team members to provide technical information and answer technical questions. However, the Account manager does not want to include the two Development team members in the email discussion with the customer, as he/she does not want to expose the email addresses of the two development team members to the customer to avoid the customer from being able to contact the two Development team members directly in future. Also, the Account manager does not want the two development team members to provide the technical information directly to the customer, as the Account manager would like to review and filter the information before it reaches the customer.

Another example may be when a manager is having a confidential email conversation with one of their staff members about a misconduct regarding the staff member's work. The case is so serious that the Manager may want to keep his/her own manager and the HR manager apprised of the details of their discussion. However, as the topic is so sensitive, the manager does not want the staff member to know that the manager's manager and the HR manager are watching over their email conversation at this stage, as that may make the staff member feel uncomfortable and reluctant to talk freely.

Yet another example may be when a senior executive is mentoring a new employee in a 'shadow' program. As such, the senior executive may want to have the new employee observe how he handles a customer case. Therefore, the senior executive may want to let the new employee see all email conversations for that customer case, including those email threads where the customer is also involved. However, the senior manager does not want the new employee to say anything in these email discussion, and the senior manager does not want the customer or other team members who are working on the customer case to know that the new employee is watching over the discussions.

Current solutions may allow the participant in the group conversation to 'forward' the contents of the discussion to the observers from time to time. With respect to an email conversation, the participant can forward the email threads to the observers. Regarding an instant messaging (IM) conversation, the participant can copy and paste the contents of the group conversation and send the contents to the observers in IM messages. However, the participant can only forward the contents at certain point of the group conversation. As the conversation progresses, the participant will have to forward the contents again to keep the observers informed about the latest development in the conversation. This method may be cumbersome since the participant has to periodically send these additional 'forwarded' messages. Additionally, there is the potential for delay in letting the observers know about the latest conversation.

Another current solution is a sender of an email can include some recipients in the 'blind carbon copy' (bcc) field. If the participant of the email conversation includes the observers in the bcc field in a message, the observers can receive that particular message, while other recipients (in the 'to' and 'cc' fields) do not know that these observers also receive a copy of the message. However, when other normal recipients reply that particular message, the observers who have been blind carbon copied will not get the replies. As the email conservation continues, the observers are 'disconnected' unless the participant includes them in the bcc field again in one of the messages in the email conversation. Moreover, there is the danger that an observer, who has been blind carbon copied in one of the email messages, accidentally replies to the message. In that case, the fact that he/she has been blind carbon copied will be exposed to other participants in the email discussion.

Furthermore, it is common that customer support teams have a generic email address for external customers (e.g. support@abc.com). As such, all messages sent to this address may be forwarded to a number of internal customer support members. Response messages sent by the individual support members will go out to the external customers as if the messages come from the generic email address. However, in this solution all messages being sent to the generic email address will be forwarded to all team members 'behind' that generic email address. One cannot direct different customer cases to different team members based on the customers or topics being discussed in the email conversation.

As such, it may be advantageous, among other things, to allow a participant in a group conversation, whether it is one in email thread or one on IM system, to add 'hidden' and 'silent' observers to the group conversation. As such, the observers can see all the messages in the group conversation, just like other normal participants, however the observers are "hidden" since other participants in the conversation cannot see them.

According to at least one implementation, the present embodiment may allow a participant in an online group conversation, whether it is one in email thread or one on IM system, to add 'hidden' and 'silent' observers to the group conversation. As such, the observers may then be able to see all the messages in the group conversation, just as other normal participants. These observers are 'hidden' since other participants in the conversation do not see them. The observers are also 'silent' since they cannot participate directly in the conversation. The system allows the observers to respond to messages in the online group conversation, but only the participant who adds the observers to the conversation (i.e., the 'enabler') can see the responses. Upon receiving the response messages from the observers, the enabler has the option to pass the response messages to other participants in the group conversation, as a regular message sent from the enabler. As a result, other participants may see these messages as messages written by the enabler, and the other participants will not know the observers are involved in the conversation.

Furthermore, in the cases that an observer sends a response message to the enabler, before the enabler passes (i.e., publishes) the response message to the group conversation, the enabler also has the option to modify the message. In certain cases, the enabler may also want to turn on an option to allow the response message to pass to the online group conversation directly, without any review or modification by the enabler. For example, if the enabler is on leave or is sick, he/she can add a 'backup' person to the group conversation to respond to the discussion messages on behalf of the enabler.

According to the present embodiment, a participant (i.e., the enabler) has the discretion to add one or more observers in a group discussion, where the observers can see all the messages in the discussion just as other normal participants see them without delay. As such, it is not necessary for the enabler to send 'updates' of the group conversation by forwarding contents of the conversation to the observers. Additionally, the enabler can select which observers should be included in an online group conversation, based on the topics being discussed, instead of having the enabler blindly forwarding all messages he/she receives to the observers. Moreover, the observers can never participate in the group conversation directly, though they are allowed to respond by sending messages to the enabler. As such, the observers are protected from exposing their identities and their involvements to other participants in the conversation, while allowing them to provide information to support the enabler in the discussion.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to allow hidden and silent observers in an online group conversation. According to at least one implementation, a participant in an online group chat or conversation (i.e., the enabler) can add one or more people as observers to the group chat or conversation. Therefore, an enabler (i.e., a participant in an online group chat or conversation) may add a silent, hidden observer to an online group chat or conversation. As such, the present embodiment may add the observer to the group chat, but mark them as observers who are linked to the enabler (who is a normal participant in the same chat). Therefore, the observer may appear in the enabler's chat window so the enabler can see the observer in the group chat. However, other participants in the group chat or conversation cannot see the observer. Furthermore the observer can see all the messages in the group chat, but the other participants cannot see the observer (except the enabler).

When the observer sends a message to the group chat, the present embodiment detects that the message comes from an observer. As such, rather than sending the message directly to the chat, the system may send the message to the enabler. Therefore, the enabler will see the message from a user interface (UI), where he/she may have the option to modify the message and send it to the group chat as if it were a message being sent by the enabler. However, according to at least one implementation, the enabler may have the option to discard the message from the observer without forwarding it to the group chat. If the enabler opts to send the message to the group chat, the other participants will see the message (or modified message) as if it were sent by the enabler.

Additionally, when the enabler adds an observer to a group chat, he/she can also specify that the observer can send a message directly to the group chat on behalf of the enabler. As such, when the observer sends a message to the group chat, the present embodiment may detect that the message comes from an observer with authority to send messages on behalf of the enabler. The present embodiment will send the message directly to the group chat, however the message will be treated as a message being sent by the enabler.

According to the present embodiment, with respect to an email system, a participant in an email thread (i.e., the enabler) can add one or more people as observers to the email thread and therefore, the observer will receive a forwarded copy of a message in the email thread. As such, the enabler's email server has to be able to support an observer feature (i.e., Email server X), but such support is not necessary for the observers or other participants in the email thread to be using the special email server X.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a Hidden and Silent Observer program 116A. The networked computer environment 100 may also include a server 114 that is enabled to run a Hidden and Silent Observer program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Hidden and Silent Observer program 116B running on server computer 114 via the communications network 110. The communications network 110 may include connections, such as wire, wireless communication links, or fiber optic cables. As will be discussed with reference to FIG. 5, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Hidden and Silent Observer program 116A, 116B may interact with a database 112 that may be embedded in various storage devices, such as, but not limited to a computer/mobile device 102, a networked server 114, or a cloud storage service.

As previously described, the client computer 102 may access the Hidden and Silent Observer program 116B, running on server computer 114, via the communications network 110. For example, a user using a client computer 102 may use the Hidden and Silent Observer program 116A, 116B to allow hidden and silent observers in an online group conversation. The Hidden and Silent Observer method is explained in more detail below with respect to FIGS. 2-4.

Figure 2:
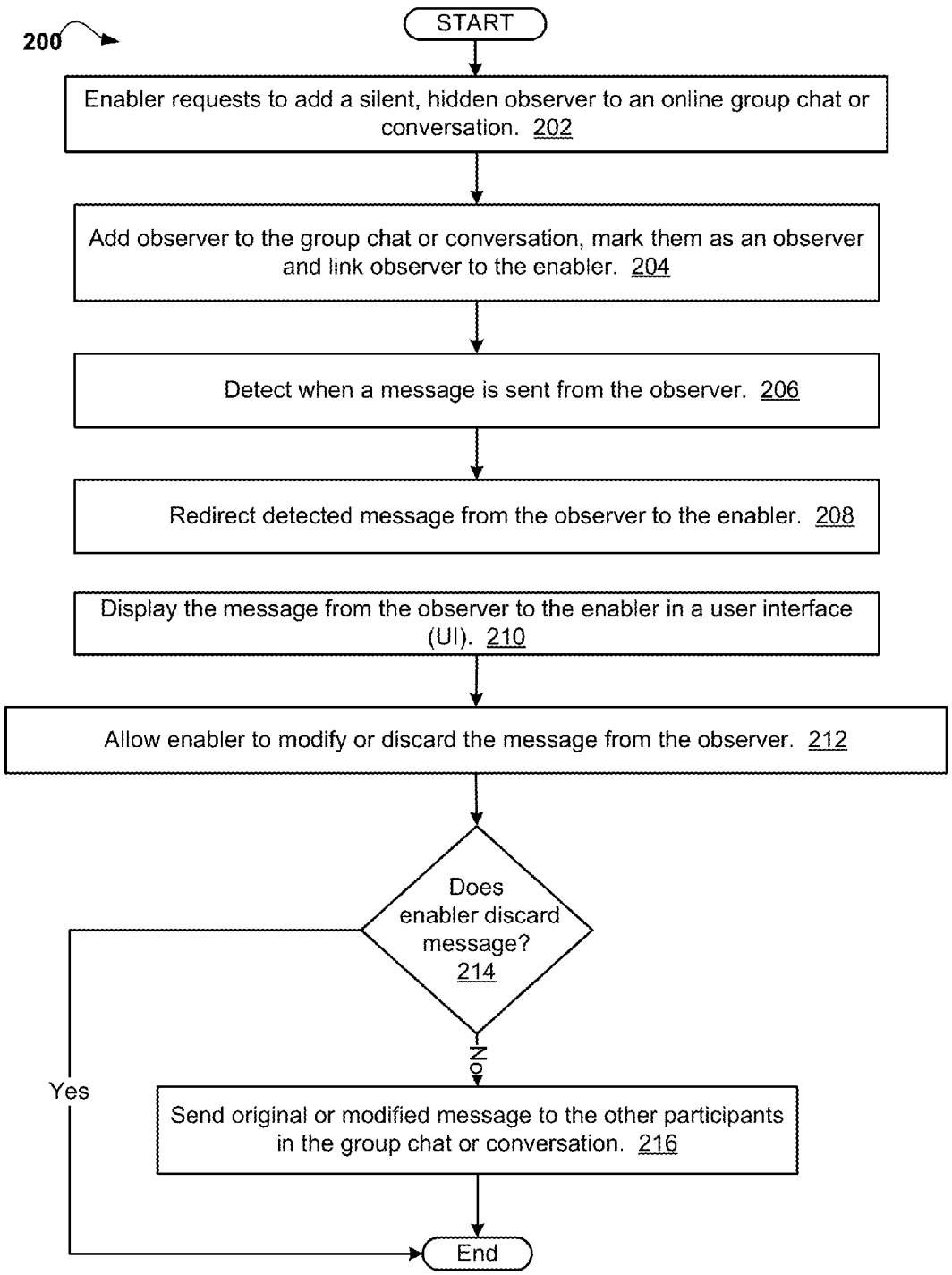
FIG. 2 is an operational flowchart illustrating the steps carried out by a program to allow hidden and silent observers in an online group conversation according to at least one embodiment.

Referring now to FIG. 2, an operational flowchart 200 illustrating the steps carried out by a program to allow hidden and silent observers in an online group conversation according to at least one embodiment is depicted. As previously described, the Hidden and Silent Observer program 116A, 116B (FIG. 1) may improve online group conversations by allowing a participant in an online group conversation to add hidden or silent observers. Additionally, the Hidden and Silent Observer program 116A, 116B (FIG. 1) may allow the observer to respond to messages in the group conversation, however, only the participant who adds the observer to the online conversation may see the observer's responses. Furthermore, upon receiving the response messages from the observer, the enabler may have the option to pass the response messages from the observer to other participants in the group conversation as a regular message sent from the enabler.

Therefore with respect to FIG. 2 at 202, an enabler (i.e., a participant in an online group chat or conversation) may add a silent, hidden observer to an online group chat or conversation.

Then at 204, the Hidden and Silent Observer program 116A, 116B (FIG. 1) will add the observer to the group chat or conversation and mark them as an observer and link the observer to the enabler. As such, the present embodiment may add the observer to the group chat, but mark them as observers who are linked to the enabler (who is a normal participant in the same chat). Therefore, the observer may appear in the enabler's chat window so the enabler can see the observer in the group chat. However, other participants in the group chat or conversation cannot see the observer. Furthermore, the observer can see all the messages in the group chat even though the other participants cannot see the observer (except the enabler).

Next at 206, the Hidden and Silent Observer program 116A, 116B (FIG. 1) will detect when a message is sent from the observer. Therefore, when the observer sends a message to the group chat, the present embodiment may detect that the message comes from an observer rather than from a normal participant of the group chat or conversation. According to the present embodiment, the 'hidden' observer can never reply directly to an email or an instant messaging conversation. As such, the 'hidden' observer is also 'silent'.

The only way an observer can participate in the conversation is to reply to the participant who has enabled the observer (i.e., the enabler). The other participants can never see the observer's identity. Only the enabler is made aware of the observer's identity. As such, the present embodiment allows a 'hidden' participant (i.e., the observer) to observe email and instant messaging conversation, and participate in the conversation, while still maintaining anonymity.

Therefore, at 208, the Hidden and Silent Observer program 116A, 116B (FIG. 1) will redirect the detected message from the observer to the enabler. As such, rather than sending the message directly to the other chat participants of the chat or conversation, the present embodiment may send the message to the enabler.

Next at 210, the Hidden and Silent Observer program 116A, 116B (FIG. 1) will display the message from the observer to the enabler in a user interface (UI). Then at 212, the Hidden and Silent Observer program 116A, 116B (FIG. 1) will allow the enabler to modify or discard the message from the observer. According to at least one implementation, the enabler will see the message from a user interface (UI), where the enabler may have the option to modify the message and send it to the group chat as if it were a message being sent by the enabler. However, according to at least one implementation, the enabler may also have the option to discard the message from the observer without forwarding it to the group chat.

Then at 214, it is determined whether the enabler discards the message. If at 214 it is determined that the enabler has opted to discard the message, then the method will end. However, if at 214 it is determined that the enabler has opted to modify or keep the message, then the method will continue to step 216 to send the original or modified message to the other participants in the group chat or conversation. Therefore, if the enabler opts to send the message to the group chat, the other participants will see the message (or modified message) as if it were sent by the enabler.

It may be appreciated that FIG. 2 provides only an illustration of one implementation and does not imply any limitations with regard to how different embodiments may be implemented. Many modifications to the depicted environments may be made based on design and implementation requirements. For example, as previously described, the Hidden and Silent Observer program 116A, 116B (FIG. 1) may allow the enabler to specify that the observer can send a message directly to the group chat on behalf of the enabler when the enabler adds an observer to a group chat. As such, when the observer sends a message to the group chat, the present embodiment may detect that the message comes from an observer with authority to send messages on behalf of the enabler. Therefore, the present embodiment will send the message directly to the group chat, however the message will be treated as a message being sent by the enabler. In this instance, the enabler may not have a chance to review or modify the message before it goes into the group chat.

Furthermore, the method described in FIG. 2 was illustrated with respect to an instant messaging system, however as will be described below with respect to FIG. 3 and FIG. 4, the present embodiment may be utilized for any online communication system, such as an email communication system. The present embodiment may allow a 'hidden', 'silent' email participant (i.e., an observer) to keep receiving emails from an on-going email conversation and also still be able to participate in the discussion without revealing the observer's identity to the other participant's (except for the enabler). Therefore, a 'hidden' observer can never reply directly to the email (or instant messaging conversation as described with respect to FIG. 2) and therefore, the observer is also 'silent'. According to at least one implementation, the only way an observer can participate in the conversation is to reply to the participant who has enabled the observer (i.e., the enabler). As such, the reply may reach the other participants of the conversation as if it is a reply from the enabler and the other participants can never see the observer's identity.

For example, as previously described, a participant in an email thread (i.e., the enabler) can add one or more people as observers to the email thread and therefore, the observer will receive a forwarded copy of a message in the email thread. As such, the enabler's email server has to be able to support an observer feature (i.e., Email server X), but such support is not necessary for the observers or other participants in the email thread to be using the special email server X. According to at least one implementation, the email messages in the same email thread can be identified in various ways, such as by identifying the email subject and recipients, or by adding In-Reply-To header in the email messages. For example, if an enabler adds an observer to an email discussion thread, then the email server X will make a record for the email thread, and add the observer email addresses to it, being linked to the enabler (who is a normal participant in the email thread).

Figure 3:
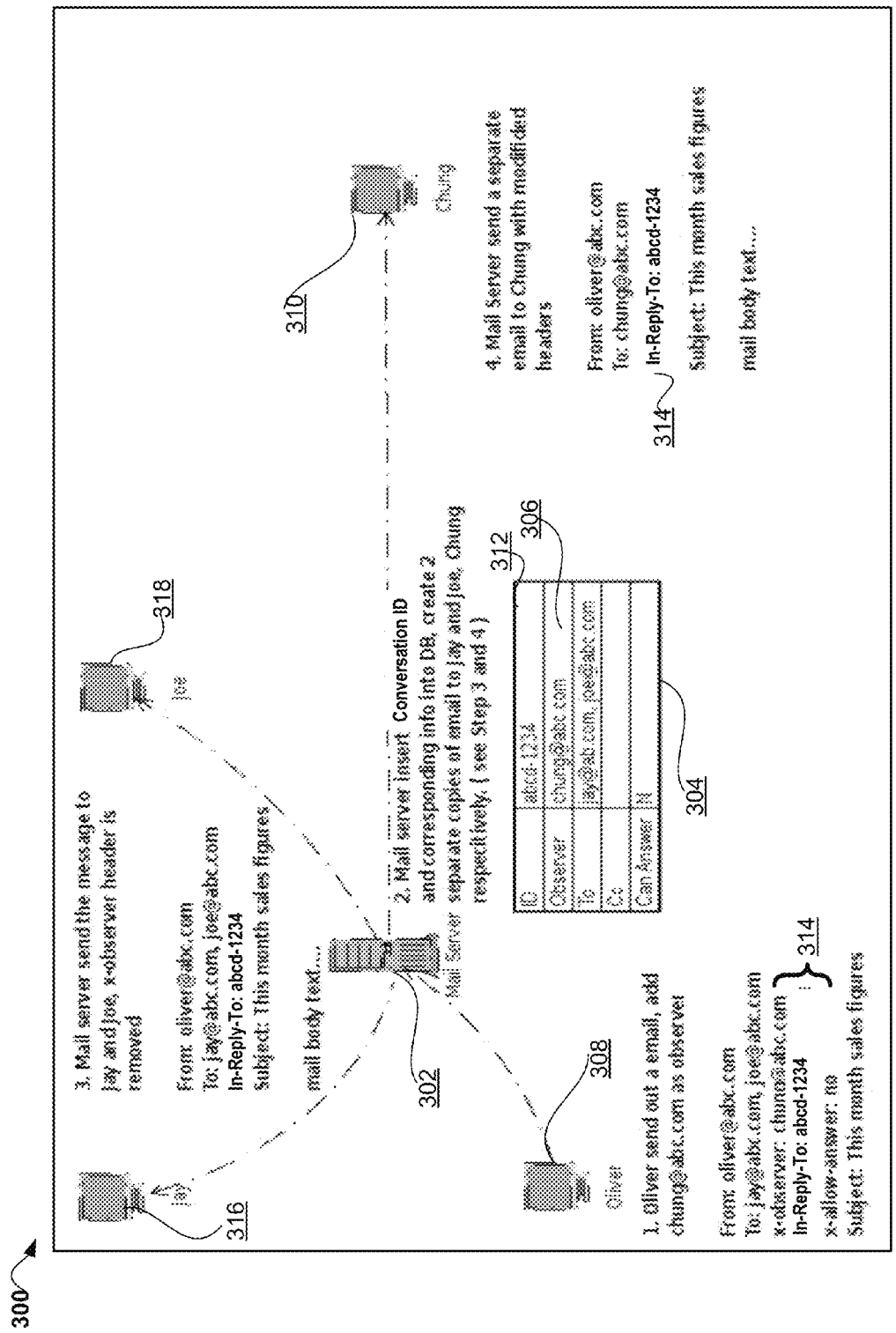
FIG. 3 is an exemplary illustration of an enabler adding an observer to an email discussion thread according to at least one embodiment.

Referring now to FIG. 3, an exemplary illustration 300 of an enabler 308 adding an observer 310 to an email discussion thread in accordance with one embodiment is depicted. As such, according to at least one implementation, the Email server X 302 will make a record 304 (stored in a database 112 (FIG. 1)) for the email thread, and add the observer's 310 email addresses 306 to it, being linked to the enabler 308 (who is a normal participant in the email thread).

When email server X 302 receives an email which is sent to the enabler 308 and identified as a message in the email thread, it will forward a copy of the message to the observer's 310 email address 306. This forwarded copy of message contains an identifier 312 in an In-Reply-To header 314, which maps this forwarded copy to the message in the email chain which content has been forwarded. An example of the stored content of the forwarded message may be as follows:

| | |
|---|---|
| From: | oliver@abc.com |
| To: | chung@abc.com |
| Cc: | |
| Bcc: | |
| Original Recipients: | joe@abc.com, jay@abc.com |
| Subject: | This month sales figures |
| Hi Guys, | |
| We need to do a better job next month. | |
| - Oliver | |

As such, when an enabler 308 sends an email from the added observer 310, the Email server X 302 will insert conversation ID 312 and corresponding information into a database 112 (FIG. 1) and create 2 separate copies of the email, one to the participants 316, 318 and one to the observer 310, respectively. The x-observer header 314 will be removed from the message that is sent to the participants 316, 318. However, the Email server X 302 will send a separate email to the observer 310 with the modified headers 314 included.

Figure 4:
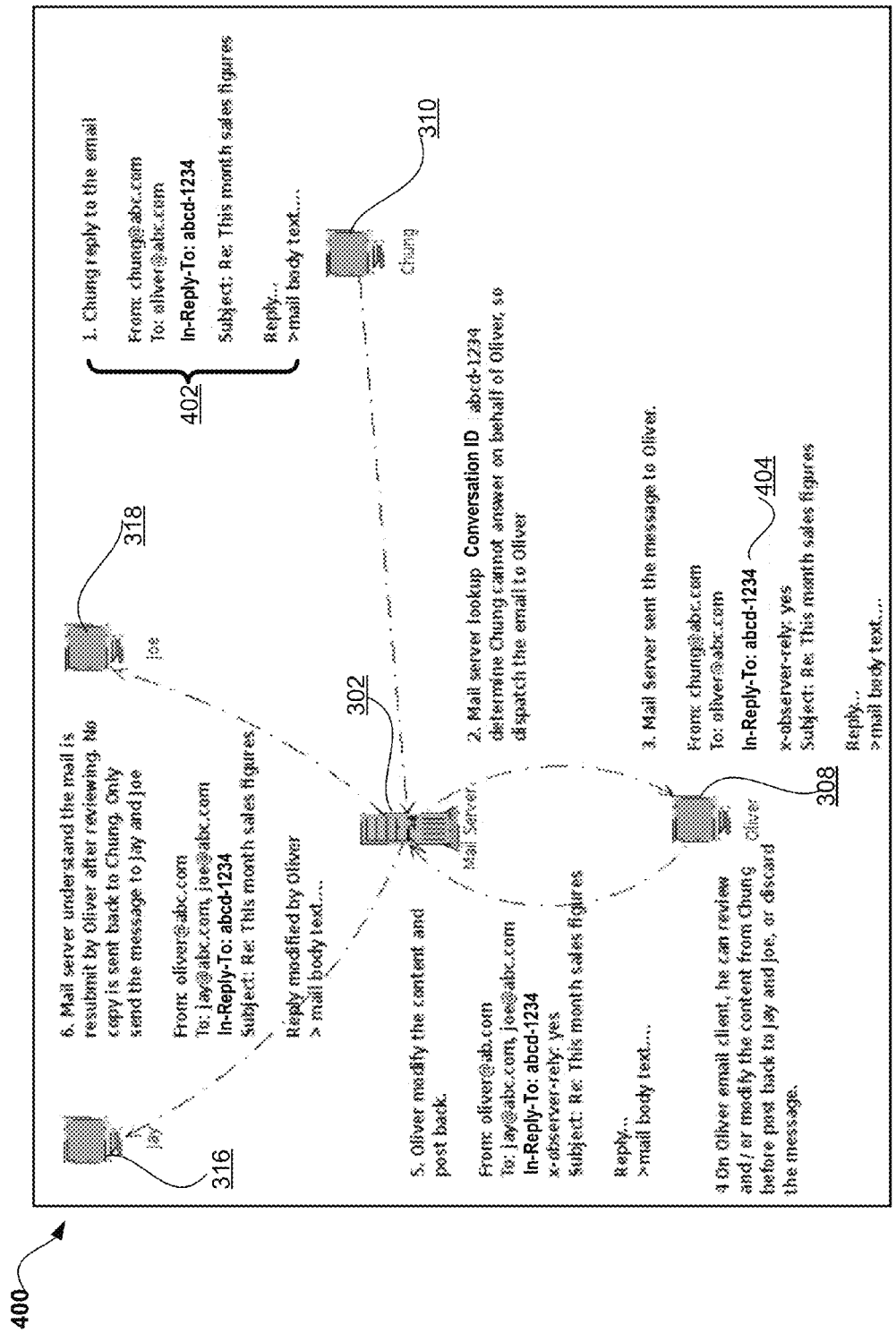
FIG. 4 is an exemplary illustration of an observer receiving a forwarded copy of a message from an email discussion thread according to at least one embodiment.

Referring now to FIG. 4, an exemplary illustration of an observer receiving a forwarded copy of the message from the email discussion thread in accordance with one embodiment is depicted. As such, according to at least one implementation, the observer 310 can see all messages in the email thread that the enabler 308 receives. However, other participants 316, 318 in the email thread do not know about this. When the observer 310 replies, the message is forwarded, however, the reply 402 will be sent only to the enabler 308 and processed by the email server X 302. Email server X 302 detects that it comes from an observer 310 by the In-Reply-To header identifier 404. As such, the Email server X 302 will look up the conversation ID in the In-Reply-To header 404 and determine that the observer 310 cannot answer on behalf of the enabler. The Email server X 302 will then send the reply message 402 to the enabler 308.

Therefore, according to the present embodiment, the enabler will see the reply message 402 displayed in a special UI, where he/she has the option to modify the contents in the reply message and send it to participants 316, 318 in the original email thread, just as though it were a reply message sent by him/her. This is achievable by email server X 302, as it stores the content of the message forwarded to the observer 310, which is exactly an email message within the email thread. Alternatively, the enabler 308 can discard the message from the observer 310 without forwarding it to the other participants 316, 318 included in the chat. The Email server X 302 understands that the email reply 402 has been resubmitted by the enabler 308 after the enabler has reviewed it. Therefore, a copy of the reply message 402 is not sent back to the observer. As such, only the participants 316, 318 are sent a copy of the reply message 402.

Figure 5:
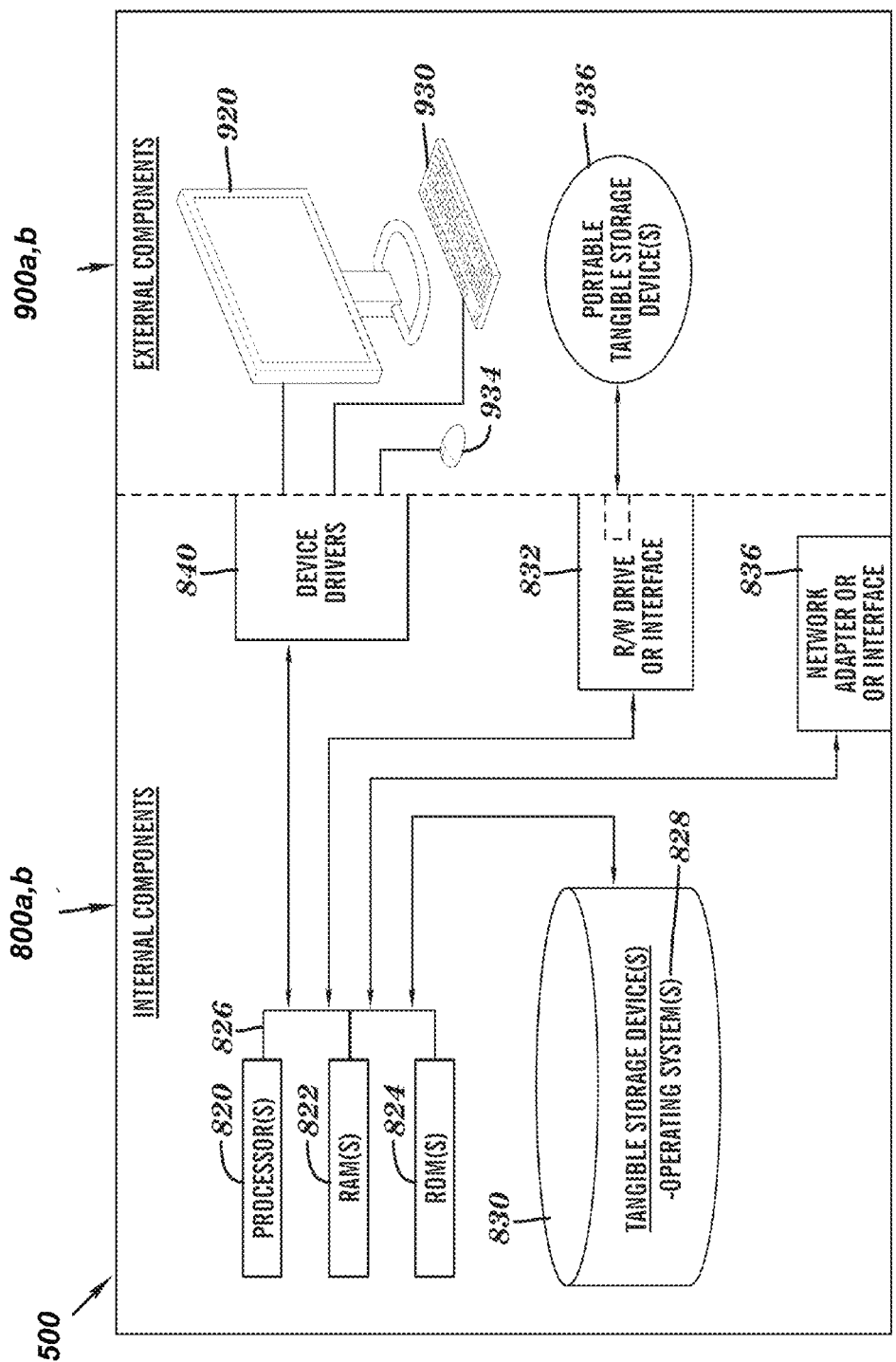
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 5. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Hidden and Silent Observer program 116A (FIG. 1) in client computer 102 (FIG. 1) and the Hidden and Silent Observer program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a,b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Hidden and Silent Observer program 116A, 116B (FIG. 1) can be stored on one or more of the respective portable computer-readable tangible storage devices 936, read via the respective R/W drive or interface 832 and loaded into the respective hard drive 830.

Each set of internal components 800 *a,b* also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Hidden and Silent Observer program 116A (FIG. 1) in client computer 102 (FIG. 1) and the Hidden and Silent Observer program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Hidden and Silent Observer program 116A (FIG. 1) in client computer 102 (FIG. 1) and the Hidden and Silent Observer program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 *a,b* can include a computer display monitor 920, a keyboard 930, and a computer mouse 934. External components 900 *a,b* can also include touch screens, virtual keyboards, touch pads, pointing devices, and other human interface devices. Each of the sets of internal components 800 *a,b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
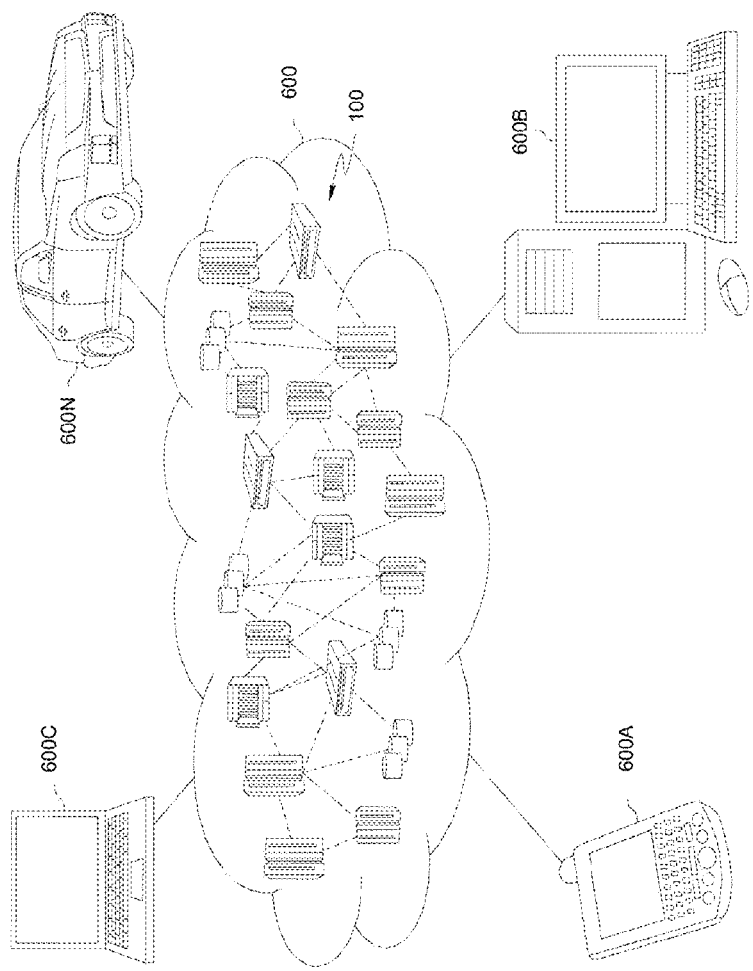
FIG. 6 is a block diagram of an illustrative cloud computing environment including the computer system depicted in FIG. 1, in accordance with an embodiment of the present disclosure.

Referring now to FIG. 6, illustrative cloud computing environment 600 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that computing nodes 100 and cloud computing environment 600 can communicate with any type of computerized device over any type of network and/or network addressable connection (e.g., using a web browser).

Figure 7:
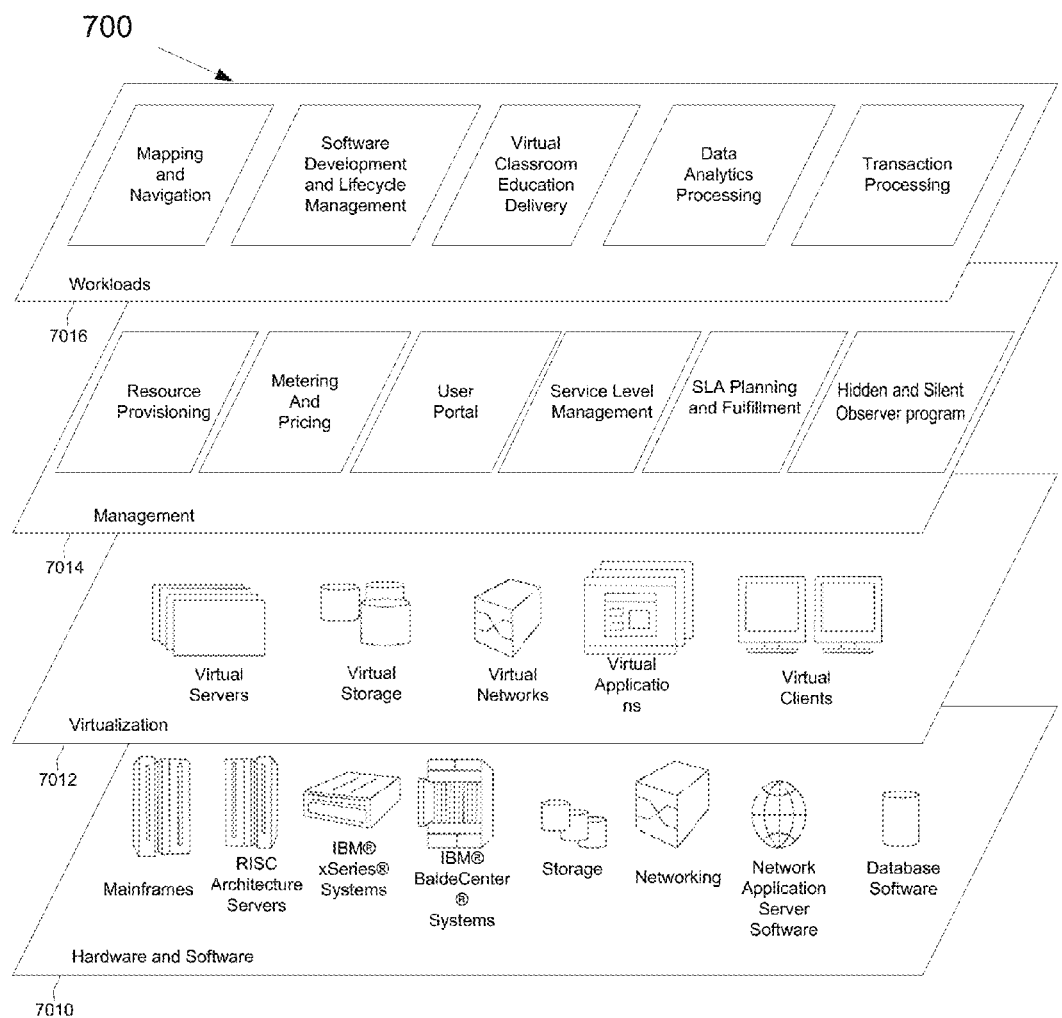
FIG. 7 is a block diagram of functional layers of the illustrative cloud computing environment of FIG. 6, in accordance with an embodiment of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 7010 includes hardware and software components. Examples of hardware components include: mainframes; RISC (Reduced Instruction Set Computer) architecture based servers; storage devices; networks and networking components. In some embodiments, software components include network application server software.

Virtualization layer 7012 provides an abstraction layer from which the following examples of virtual entities may be provided: virtual servers; virtual storage; virtual networks, including virtual private networks; virtual applications and operating systems; and virtual clients.

In one example, management layer 7014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Hidden and Silent Observer program may allow hidden and silent observers in an online group conversation.

Workloads layer 7016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system to enable a participant within a plurality of participants in an online group conversation to add at least one additional participant as an observer to the online group conversation, the computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
receiving a request to add the observer to the online group conversation;
adding the observer to the online group conversation based on the received request;
detecting a message being sent from the added observer;
redirecting the detected message to the enabled participant, wherein redirecting the detected message to the enabled participant comprises creating an online forwarded copy of the redirected detected message and adding an identifier as a conversation ID to the online forwarded copy, wherein the added identifier maps the online forwarded copy in an online database as the online forwarded copy to the redirected detected message in an original email chain associated with the redirected detected message along with the conversation ID and a plurality of corresponding information associated with the redirected detected message;
displaying the redirected message in a user interface (UI) to the enabled participant;
detecting a modification or a deletion of the displayed redirected message by the enabled participant;
sending the displayed redirected message from the enabled participant to the plurality of participants, wherein the sent message is in an original format or a modified format and does not include the conversation ID; and sending a copy of the displayed redirected message from the enabled participant to the added observer, wherein the sent copy of the displayed redirected message includes the conversation ID.

2. The computer system of claim 1, wherein the online group conversation is associated with an online instant messaging communication system or an online email communication system.

3. The computer system of claim 1, wherein the enabled participant can allow a response message to pass to the plurality of participants directly, without a review or a modification by the enabled participant.

4. The computer system of claim 3, wherein an identity associated with the observer is revealed only to the enabled participant.

5. The computer system of claim 3, wherein the observer is silent and can only respond to the enabled participant.

6. The computer system of claim 1, wherein the observer can see a plurality of messages associated with the on-line group conversation.

7. The computer system of claim 3, wherein the enabled participant can decide if the observer should be added to the online group conversation based on a plurality of topics associated with the online group conversation.

8. A computer program product to enable a participant within a plurality of participants in an online group conversation to add at least one additional participant as an observer to the online group conversation, the computer program product comprising:

one or more computer-readable storage devices and program instructions stored on at least one of the one or more tangible storage devices, the program instructions executable by a processor, the program instructions comprising:

program instructions to receive a request to add the observer to the online group conversation;

program instructions to add the observer to the online group conversation based on the received request;

program instructions to detect a message being sent from the added observer;

program instructions to redirect the detected message to the enabled participant, wherein redirecting the detected message to the enabled participant comprises creating an online forwarded copy of the redirected detected message and adding an identifier as a conversation ID to the online forwarded copy, wherein the added identifier maps the online forwarded copy in an online database as the online forwarded copy to the redirected detected message in an original email chain associated with the redirected detected message along with the conversation ID and a plurality of corresponding information associated with the redirected detected message;

program instructions to display the redirected message in a user interface (UI) to the enabled participant;

program instructions to detect a modification or a deletion of the displayed redirected message by the enabled participant;

program instructions to send the displayed redirected message from the enabled participant to the plurality of participants, wherein the sent message is in an original format or a modified format and does not include the conversation ID; and program instructions to send a copy of the displayed redirected message from the enabled participant to the added observer, wherein the sent copy of the displayed redirected message includes the conversation ID.

9. The computer program product of claim 8, wherein the online group conversation is associated with an online instant messaging communication system or an online email communication system.

10. The computer program product of claim 8, wherein the enabled participant can allow a response message to pass to the plurality of participants directly, without a review or a modification by the enabled participant.

11. The computer program product of claim 10, wherein an identity associated with the observer is revealed only to the enabled participant.

12. The computer program product of claim 10, wherein the observer is silent and can only respond to the enabled participant.

13. The computer program product of claim 8, wherein the observer can see a plurality of messages associated with the on-line group conversation.

* * * * *